United States Patent
Wyatt, II et al.

(10) Patent No.: US 7,692,098 B2
(45) Date of Patent: Apr. 6, 2010

(54) COAXIAL CABLE HAVING WIDE CONTINUOUS USABLE BANDWIDTH

(75) Inventors: Frank B. Wyatt, II, Hickory, NC (US); Robert A. Wessels, Jr., Hickory, NC (US); Christopher Alan Story, Hickory, NC (US); Douglas J. Blew, Morresville, NC (US); Michael Gialenios, Charlotte, NC (US)

(73) Assignee: CommScope Properties, LLC, Sparks, NV (US)

(*) Notice: Subject to any disclaimer, the term of this patent is extended or adjusted under 35 U.S.C. 154(b) by 0 days.

(21) Appl. No.: 12/022,702

(22) Filed: Jan. 30, 2008

(65) Prior Publication Data

US 2008/0124034 A1 May 29, 2008

Related U.S. Application Data

(63) Continuation of application No. 10/611,478, filed on Jul. 1, 2003, now abandoned, which is a continuation-in-part of application No. 10/192,215, filed on Jul. 10, 2002, now abandoned.

(51) Int. Cl.
*H01B 9/02* (2006.01)
(52) U.S. Cl. .................................. 174/102 R
(58) Field of Classification Search ............ 174/102 R, 174/110 F, 36
See application file for complete search history.

(56) References Cited

U.S. PATENT DOCUMENTS

| 3,822,470 | A | | 7/1974 | Hildebrand |
| 4,638,114 | A | * | 1/1987 | Mori ............................. 174/36 |
| 5,210,377 | A | * | 5/1993 | Kennedy et al. ............. 174/107 |
| 5,371,484 | A | | 12/1994 | Nixon |
| 5,898,133 | A | * | 4/1999 | Bleich et al. ............. 174/121 A |
| 6,385,366 | B1 | * | 5/2002 | Lin ............................... 385/24 |
| 2002/0096354 | A1 | | 7/2002 | Chopra et al. |

FOREIGN PATENT DOCUMENTS

WO WO 98/13834 4/1998
WO WO 92/13426 A2 2/2002

OTHER PUBLICATIONS

International Search Report for PCT/US2004/020849, mailed Dec. 10, 2004.

* cited by examiner

*Primary Examiner*—Chau N Nguyen
(74) *Attorney, Agent, or Firm*—Myers Bigel Sibley & Sajovec

(57) ABSTRACT

A coaxial cable includes: a metallic inner conductor formed of a first material and having a first thickness; a dielectric layer circumferentially surrounding the inner conductor formed of a second material and having a second thickness; a metallic outer conductor circumferentially surrounding the dielectric layer formed of a third material and having a third thickness; and a polymeric jacket circumferentially surrounding the outer conductor formed of a fourth material and having a fourth thickness.

14 Claims, 3 Drawing Sheets

COAXIAL CABLE HAVING WIDE CONTINUOUS USABLE BANDWIDTH

RELATED APPLICATIONS

This application is a continuation of U.S. application Ser. No. 10/611,478, filed Jul. 1, 2003, now abandoned which claims priority from continuation-in-part of U.S. application Ser. No. 10/192,215, filed 10 Jul. 2002, now abandoned the disclosure of which is hereby incorporated herein in its entirety.

FIELD OF THE INVENTION

The present invention is directed generally to coaxial cables, and more specifically to coaxial cables with high bandwidth.

BACKGROUND OF THE INVENTION

A coaxial cable is typically an excellent medium for transmitting video and data signals because it can resist electromagnetic interference (EMI) and can support high bandwidth transmissions. Coaxial cables commonly used today for transmission of RF signals, such as television signals, for example, typically include a core containing an inner conductor and a metallic sheath surrounding the core and serving as an outer conductor. A dielectric material surrounds the inner conductor and electrically insulates it from the surrounding metallic sheath. In some types of coaxial cables, air is used as the dielectric material, and electrically insulating spacers are provided at spaced locations throughout the length of the cable for holding the inner conductor coaxially within the surrounding sheath. In other known coaxial cable constructions, an expanded foamed polymeric dielectric surrounds the inner conductor and fills the spaces between the inner conductor and the surrounding metallic sheath.

One important attribute of coaxial cable is its ability to propagate a signal with as little attenuation as possible. One method of measuring signal propagation is expressed as a percentage of the speed of light, commonly known as velocity of propagation ($V_P$). Coaxial cables of the "air dielectric" type of construction have very good signal propagation characteristics, with $V_P$ values typically 90% or higher. However, these coaxial cables unfortunately have relatively limited bending characteristics and are typically susceptible to buckling, flattening or collapsing of the outer sheath, which may adversely affect the electrical properties of the cable and/or render it unusable. Consequently, air dielectric type coaxial cables typically require very careful handling during installation to avoid such damage. Additionally, they may not be recommended for use in installations requiring small radius bends or frequent reverse bends. Note that they typically have structural return loss (SRL) peaks corresponding to the disk separation distance (the disks being included along the length of the cable to support the conductor within the shield), which is usually designed to be above the standard operating bandwidth (i.e., greater than 1 GHz). Extended frequencies beyond 1 GHz can cause the disk spacing to become much closer, thus increasing $V_p$ attenuation, and cost.

Coaxial cables of the "foam dielectric" type of construction, on the other hand, ordinarily possess significantly better bending properties than air dielectric cables. They can be more easily installed without undue concern over buckling, flattening or collapsing of the outer sheath and they can be used in environments where air dielectric type cables are unsuitable. However, they can be hampered by a somewhat lower velocity of propagation than air dielectric type cables. This reduction in $V_P$ and increase in attenuation loss may be attributable to the foam dielectric.

In addition, foam dielectric cables typically present more difficulties with attachment of the cable to connectors and couplings. "Connectorization" can be important to the operator making the connection, as on some occasions the connection process may be carried out in inconvenient locations (e.g., under a house or while perched on a telephone pole or the like). Ordinarily, prior to fitting a cable to a connector, a short length of the dielectric material is removed from the end of the cable with a coring tool, which leaves the core and shield of the cable free to contact and connect to the connector or coupling. It is important to remove a sufficient amount of the dielectric material from the core and sheath (i.e., leaving little to no dielectric material remaining) so that the electrical connection between the cable and the connector is sound. In most instances the dielectric material is bonded to the core and sheath with an adhesive, which can further complicate the coring process.

Other properties of coaxial cable that can be important to performance of the cable include usability across a wide bandwidth spectrum (at least 1.0 GHz, and perhaps as much as 5.0 GHz), good return loss characteristics (for example, at least −20 db, and preferably at least −30 db), flexibility, ruggedness and/or durability relative to the surrounding environment, and manufacturability. In particular, it would be desirable for a coaxial cable to have a wide usable bandwidth spectrum with acceptable attenuation characteristics that has a nominal 75Ω impedance (which is commonly used when attenuation characteristics are of primary concern) or 50Ω impedance (which is typically used when power transfer is of primary concern), and which meets at least some of the other performance characteristics of interest.

SUMMARY OF THE INVENTION

In view of the foregoing, the present invention is directed to a coaxial cable that can address some of these issues. As a first aspect, embodiments of the invention are directed to a coaxial cable comprising: a metallic inner conductor formed of a first material and having a first thickness; a dielectric layer circumferentially surrounding the inner conductor formed of a second material and having a second thickness; a metallic outer conductor circumferentially surrounding the dielectric layer formed of a third material and having a third thickness; and a polymeric jacket circumferentially surrounding the outer conductor formed of a fourth material and having a fourth thickness. A least one of the first material, first thickness, second material, second thickness, third material, third thickness, fourth material and fourth thickness is selected so that the cable has: a usable bandwidth between about 5 MHz and the cut-off frequency of the cable; a minimum bend radius of less than about 5 times the jacket outer diameter; and a velocity of propagation of greater than about 88 percent.

As a second aspect, embodiments of the invention are directed to a coaxial cable comprising: a metallic inner conductor formed of a first material and having a first thickness; a dielectric layer circumferentially surrounding the inner conductor formed of a second material and having a second thickness; a metallic outer conductor circumferentially surrounding the dielectric layer formed of a third material and having a third thickness; and a polymeric jacket circumferentially surrounding the outer conductor formed of a fourth material and having a fourth thickness. A least one of the first material, first thickness, second material, second thickness, third material, third thickness, fourth material and fourth thickness is selected so that the dielectric layer can be cored from the cable with a standard coring tool such that less than a 360 degree residue remains on the inner surface of the metallic shield and so that the cable has: a usable bandwidth between about 5 MHz and the cut-off frequency of the cable; and a minimum bend radius of less than 5 times the jacket outer diameter.

As a third aspect, embodiments of the invention are directed to a coaxial cable comprising: a metallic inner conductor formed of a first material and having a first thickness; a dielectric layer circumferentially surrounding the inner conductor formed of a second material and having a second thickness; a metallic outer conductor circumferentially surrounding the dielectric layer formed of a third material and having a third thickness; and a polymeric jacket circumferentially surrounding the outer conductor formed of a fourth material and having a fourth thickness. A least one of the first material, first thickness, second material, second thickness, third material, third thickness, fourth material and fourth thickness is selected so that the dielectric layer can be cored from the cable with a standard coring tool such that less than a 360 degree residue remains on the inner surface of the metallic shield and so that the cable has: a usable bandwidth between about 5 MHz and the cut-off frequency of the cable; and a velocity of propagation of greater than about 88 percent.

As a fourth aspect, embodiments of the invention are directed to a hybrid fiber cable (HFC) network, comprising any coaxial cable as described above and an optical fiber in communication with the coaxial cable to define a transmission path. In some embodiments, the optical fiber has a zero dispersion wavelength of about 1310 nm, a loss at 1385 nm that is less than its loss at 1310 nm and a chromatic dispersion of between 1.5 and 8.0 ps/nm-km in the 1.4 μm wavelength region, and in other embodiments a multiplexer is in communication with the optical fiber.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Instead, these embodiments are provided so that this disclosure will be thorough and complete, and will fully convey the scope of the invention to those skilled in the art. It will be understood that when an element (e.g., coaxial cable or cable jacket) is referred to as being "connected to" another element, it can be directly connected to the other element or intervening elements may also be present. In contrast, when an element is referred to as being "directly connected to" another element, there are no intervening elements present. Like numbers refer to like elements throughout. Some dimensions and thicknesses may be exaggerated for clarity.

Figure 1:
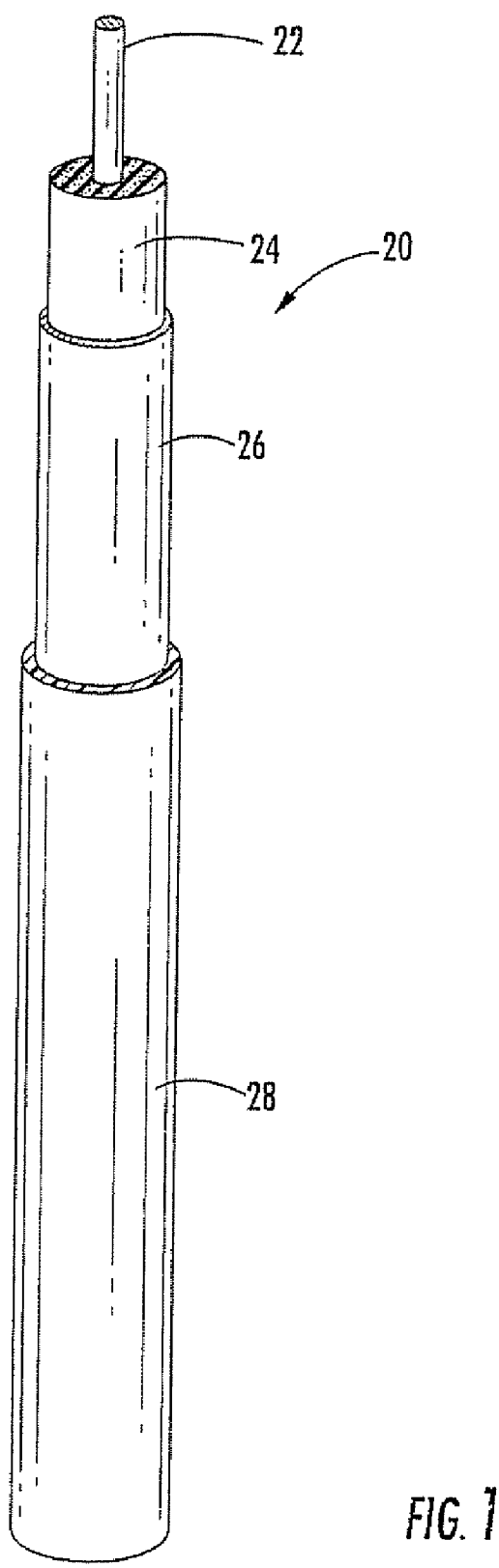
FIG. 1 is a cutaway perspective view of a coaxial cable of the present invention.
Figure 2:
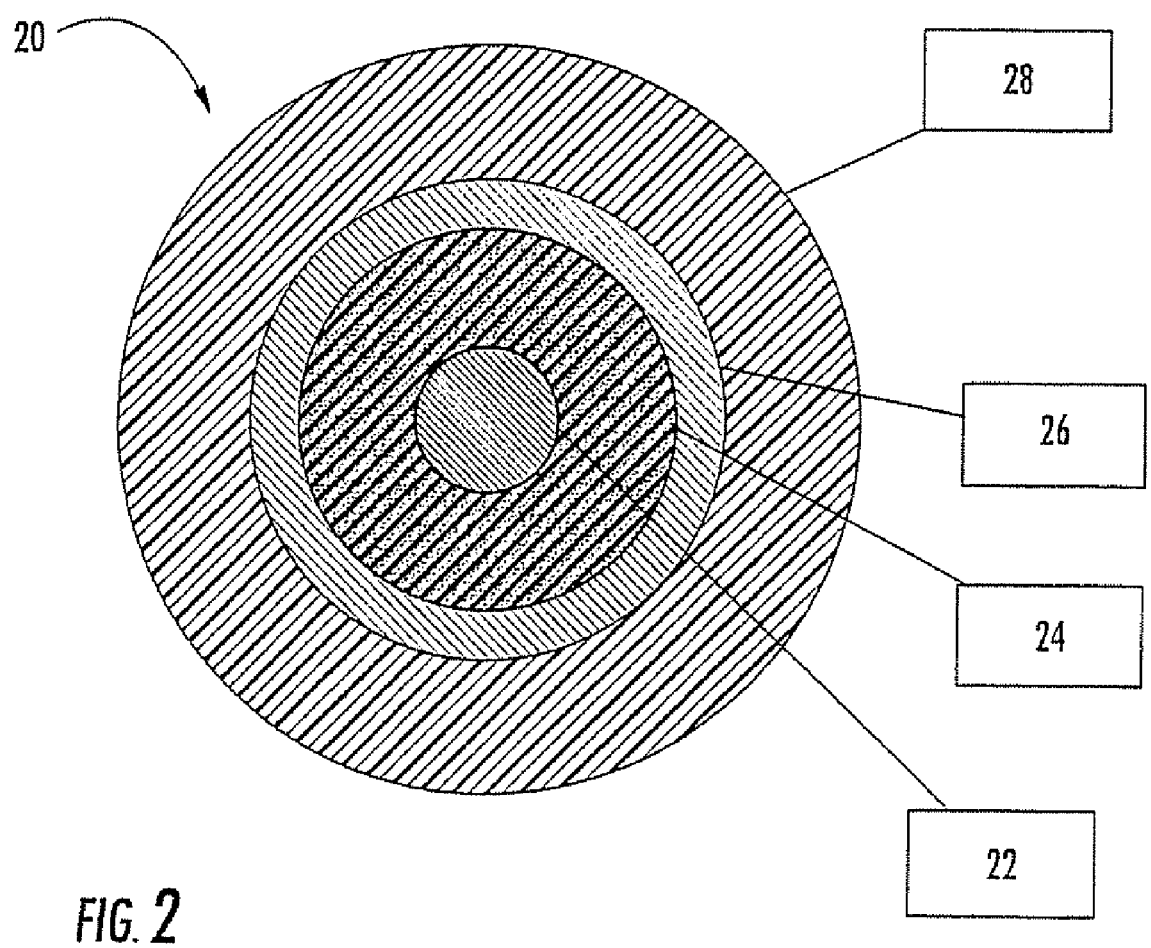
FIG. 2 is a section view of the coaxial cable of FIG. 1.

Referring now to the drawings, a coaxial cable, designated broadly at 20, is illustrated in FIGS. 1 and 2. The coaxial cable 20 includes a central inner conductor 22, a dielectric layer 24, an outer conductor 26, and an outer jacket 28. These components are described in detail below.

The conductor 22 is typically formed of solid wire. It can be formed of any material that can conduct an electrical signal, but is preferably formed of solid copper, copper-clad aluminum (CCA) or copper-clad steel (CCS), with any of these materials being optionally plated with tin, silver or gold. Such plating can reduce the resistance of the inner conductor 22. In some embodiments, tempering of the copper, aluminum or steel under specific conditions during their formation can be carried out to enhance performance and/or impact conductivity. Also, when copper is employed as either the core material or as a cladding material, it may be preferred to use so-called "oxygen-free" copper, which is a commercially pure, high conductivity copper that has been produced in such a manner that it contains virtually no oxides or residual deoxidants.

It is preferred that the inner conductor 22 have a diameter or thickness of between about 0.022 and 0.710 inches. Typically, the inner conductor diameter will vary depending on the desired impedance rating (e.g., a nominal 50Ω or 75Ω cable, which typically carries a tolerance of ±2Ω), the dielectric constant of the dielectric layer 24, and the overall size and/or attenuation desired in the cable 20. As an example, for a 50Ω cable that employs foamed polyethylene as the dielectric material and an outer conductor diameter of 0.540 inch, the diameter of the inner conductor may be about 0.201 inch. Other impedance levels for the same outer conductor diameter can be achieved with other combinations of inner conductor size and materials of construction (for 75Ω cable examples, see Examples supra). Typically, signal attenuation can be reduced in a coaxial cable by proportionally increasing the size of the inner and outer conductors 22, 26 (assuming constant properties of the dielectric layer 24).

The dielectric layer 24 circumferentially surrounds the inner conductor 22. The dielectric layer 24 is typically formed of a low dielectric loss polymeric material, such as polyethylene or fluorinated polyethylene, with foamed versions of these materials being preferred. In some embodiments, a mixture of high and low density polyethylene (for example, in a 75:25 or 85:15 mixture) may be employed. In particular, it is preferred that the material provide a low dissipation factor (such as 0.0001) to the cable 20; such is characteristic of certain polyethylene materials that are largely free of contaminants and that have relatively uniform polymer chain lengths. The material comprising the dielectric layer 24 will typically include additives, such as antioxidants and other stabilizers, that can maintain the integrity of the polymer over time.

The dielectric layer 24 typically has a thickness of between about 0.100 and 1.95 inches and a ratio of its thickness to the diameter of the inner conductor 22 of between about 2 and 4, depending on the desired characteristic impedance. The dielectric layer 24 may also have a density gradient about its cross-section (either gradually or as a "step" change) in which the density increases with radial distance from the inner conductor 22. This configuration, which can improve the outer support of the dielectric layer 24 and, in turn, the bending properties of the coaxial cable 20, is described in U.S. Pat. No. 6,037,545 to Fox et al. and U.S. Pat. No. 5,959,245 and U.S. Pat. No. 6,137,058 to Moe et al., the disclosures of which are hereby incorporated herein in their entireties. This gradient can be achieved though a two-step extrusion process with two different materials, or can be formed in a single step by "overfoaming" the layer 24 and collapsing the peripheral regions of the foam or by other methods known in this art.

If, as described above, a foamed polymeric material is employed in the dielectric layer 24, it may be formed in a manner that produces an expanded cell foam. This expansion of cell size (which can cause the foam to have a lower density, with accompanying dielectric behavior improvement, that more closely resembles that of air while retaining the structural advantages of foam) can be achieved by including nucleating agents (i.e., components that cause foaming in polymeric pellets) that have been subjected to little or no heat history (for example, the nucleating agent may be protected with a thermoplastic resin binder and applied as a coating to the polymeric pellets). Alternatively, foaming may be carried out through the injection of nitrogen or another gas into the molten polymer at high pressure: when the polymer is extruded, foaming occurs after the release of the pressure. Exemplary nucleating agents and foaming procedures are described in Fox et al., supra, and need not be described in detail herein.

The dielectric layer 24 is typically secured to the inner conductor 22 with an adhesive (not shown), as the inclusion of an adhesive can improve the bending characteristics of the cable 20. The dielectric layer 24 may be extruded directly onto the conductor 22, or may be formed separately and adhered in a subsequent step. The adhesive should be selected to provide a uniform bonding layer between the conductor 22 and the dielectric layer 24, and is typically applied in as thin a layer as possible. In some embodiments, it is desirable that the adhesive preferentially adhere to the dielectric layer 24 and release the conductor 22 (for example, this characteristic may improve the coring process during attachment of the cable 20 to a connector—such adhesives are generally termed as "controlled" adhesives, as opposed to "aggressive" adhesives, which are not intended to release preferentially). Controlled formulations may be diluted in a solvent (such as water or an organic or polymeric solvent) to as 10 percent by weight or lower; aggressive adhesives may have no solvent or may be diluted to a much lesser degree (for example, 25 or 50 percent). Some formulations may include blocking agents, like waxes or oils, that can assist with release properties.

The adhesive may be applied as a "precoat" on the conductor 22 or applied separately before or during the addition of the dielectric layer 24. Exemplary adhesives include low density polyethylene, ethylene acrylic acid (EAA) and ethylene methylacrylate (EMA) and mixtures and formulations thereof.

The shield 26 circumferentially surrounds the dielectric layer 24 and is formed of a conductive material, which may be the same as or different from that of the inner conductor 22. Exemplary conductive materials include aluminum and copper (either bare, tinned, silvered, or, in the case of aluminum, plated with copper). The outer conductor 26 many be in solid tube, welded tube, foil or braided form, or in combinations of these forms, although for high performance cables solid tube or welded tube shields are preferred. In foil form, the outer conductor 26 may comprise thin sheets of conductive material bonded to opposite sides of a polypropylene or polyester tape, or may comprise a solid layer. In braided form, the outer conductor 26 comprises flexible wire woven or spirally served around the dielectric layer 24. Irrespective of its configuration, the outer conductor 26 should have good elongation and fatigue life to enable it to withstand repeated bending. Tempering and other processing steps in the manufacture of the material of the outer conductor 26 can improve and/or enhance these characteristics.

In some embodiments, the outer conductor 26 is attached to the dielectric layer 24 with an adhesive (not shown), which can improve the bending properties of the cable 20. Exemplary adhesives include EAA, EMA and mixtures and formulations thereof. The adhesive may be applied via co-extrusion with the dielectric layer 24 or may be applied separately. To improve the coring process, it may be preferable for the adhesive to preferentially bond to the dielectric layer 24 and release from the outer conductor 26.

The outer conductor 26 typically has a thickness of between about 0.006 and 0.040 inches. In some embodiments the outer conductor 26 is constructed so that its ratio of wall thickness to total diameter (the T/D ratio) is less than about 2.5 percent.

The outer conductor 26 is typically applied to the dielectric layer 24 through one of two application processes: swaging and/or welding. In the welding process, a thin flat sheet of shielding material is bent into a cylinder and welded at the resulting seam. In the swaging process, a tubular blank of conducting material is extruded to a length somewhat shorter than the length of cable desired. The blank is pulled in its axial direction to cause it to lengthen; in doing so, its diameter shrinks, such that the resulting outer conductor fits snugly onto the dielectric layer 24. In some embodiments, a welded outer conductor will undergo a swaging step in order to fit the outer conductor 26 onto the dielectric layer 24.

In some cable embodiments, an additional corrosion-resistant layer may be present between the outer conductor 26 and the jacket 28, particularly when the cable 20 is to be buried in use (this is typically tested with an industry-standard salt fog test under ASTM-B117 and SCTE IPS TP-017). The corrosion-resistant material may take the form of a tar or flowable gel (often termed a "floodant"), or may comprise a dry material. Dry corrosion-resistant materials may be preferred in some embodiments in that they may permit the jacket 28 to be bonded to the outer conductor 26, which bonding can improve bending and flexural properties of the cable 20, eliminate concerns with messy floodants, and enable the cable 20 to be used in multiple installation situations (e.g., direct buried, aerial, duct, and the like). Exemplary dry corrosion-resistant materials include sulphonate salts, carboxylate salts, amine salts, silicates, and phosphates.

The jacket 28 circumferentially surrounds the outer conductor 26 and is typically formed of a polymeric material, which may be the same as or different from that of the dielectric layer 24. Exemplary materials include polyvinylidene fluoride, polyethylene, polyvinylchloride, and copolymers and blends thereof. The jacket 28 should be formed of a material that can protect the internal components from external elements (such as water, dirt, dust and fire) and from physical abuse. The material of the jacket 28 may include additives, such as carbon black, which can provide UV resistance. Ordinarily, the jacket 28 has a thickness of between about 0.020 and 0.070 inches. In some embodiments, the jacket 28 is bonded to the outer conductor 26 with an adhesive (not shown); exemplary adhesives are as described above.

The materials and dimensions thereof should be selected so as to provide the cable 20 with desired high-performance properties. For example, the cable 20 may have a usable bandwidth, or even a continuous usable bandwidth, from about 5.0 MHz to at least 1.0 GHz, 3.0 GHz, 3.5 GHz, 4.0 GHz, 4.5 GHz, 5.0 GHz, or even up to the theoretical cut-off frequency of the cable 20 (as measured by Equation 1 below)

$$\text{Freq}_{cutoff} = 7.51 V_p/(D+d) \qquad \text{(Equation 1)}$$

wherein $\text{Freq}_{cutoff}$ is the cut-off frequency, Vp is the velocity of propagation, D is the inner diameter of the outer conductor, and d is the outer diameter of the center conductor.

This usable bandwidth may be continuous or may have some attenuation spikes at certain frequencies of transmission. The cable 20 may also have a return loss of −15 db, −20 db, −25 db, −30 db, −45 db or more. The cable 20 may have a nominal impedance of 50Ω (preferred for power transfer performance), 75Ω (preferred for attenuation performance) or some other desired impedance level. The cable 20 may also have a velocity of propagation ($V_P$) of 88 percent, or even 90 percent or more, as measured by ASTM 4566-1.

Mechanically, the cable 20 may have very desirable performance properties. For example, the cable 20 may have a minimum bend radius (as measured by SCTE IPS TP-108) that is less than about 10 times the outer diameter of the jacket 28, and in some embodiments less than 5 times the jacket outer diameter. As another example, the cable 20 may exhibit improved reverse bend performance (as measured by repeatedly bending the cable over a mandrel having a radius of twenty times the diameter of the outer conductor of the cable), such that it may endure 5 to 100 cycles prior to failure (failure being defined as buckling or ovality of the cable 20; see CommScope, Inc. HFC Upgrade Manual, Volume 1, Coax (1998). The cable 20 may also exhibit improved cyclic or expansion loop fatigue resistance (as measured by fatiguing the cable by expansion loop fatigue testing described in *Improved Plant Life through Longer Lasting Trunk and Distribution Cable*, available at www.nadrew.com), such that it can withstand 5,000 or over 20,000 cycles prior to failure.

The cable 20 may also be configured such that it "connectorizes" suitably. For example, the materials of the cable 20 (and in particular the materials of the dielectric material and the adhesives attaching the dielectric layer 24 to the core 22 and outer conductor 26) may be selected such that, when a conventional coring tool is employed on the cable 20, less than a 360 degree residue of dielectric material remains on the inner surface of the outer conductor 26. In some embodiments, it is preferred that no residue remain on the inner surface of the outer conductor 26 in the cored region. Conventional coring tools are exemplified by Lemco XQ 715, available from Lemco Tool Corporation, Cogan Station, Pa., Cablematic QRT 715, available from Ripley Co., Cromwell, Conn., and CablePrep SCT 715QR, available from CablePrep, Chester, Conn., and their configurations and use will be understood by those skilled in this art.

The cable 20 may be employed in a variety of applications, particularly those that can benefit from a high performance cable. Exemplary applications for the cable 20 include cable television cables, security cameras and video devices, video-on demand devices, high-speed Internet access systems, high frequency satellite transmission and reception devices, data communication systems, computer networks, and residential telecommunication systems. The cable 20 may also be used in hybrid fiber cable (HFC) networks in conjunction with optical fiber, particularly optical fiber using dense wavelength division multiplexing (DWDM) and/or zero water peak (ZWP) or low water peak (LWP) enhanced fiber systems. For descriptions of exemplary optical fibers and HFC networks, see U.S. Pat. No. 6,205,268 to Chraplyvy et al. and co-pending and co-assigned U.S. patent application Ser. No. 10/192,215, filed Jul. 25, 2000, the disclosures of each of which are hereby incorporated by reference herein.

In some embodiments, the cable 20 may have a length of no more than about 150 feet; in such embodiments, the structural return loss characteristics of the cable 20 may be less stringent (for example, about −15 db) than with other applications because of the relatively short signal path. The cable 20 may also be constructed in standardized lengths (e.g., 1000 feet) or in a customized length as desired.

When constructed as described, a cable 20 of the present invention can provide the user a variety of premium physical and electrical properties. As such, a single cable type can be employed in different applications. For example, if the desired electrical and mechanical properties are present in a single cable 20, it can be used in buried, aerial and duct applications, each of which have different performance requirements (as an example, a buried cable needs corrosion-resistance, whereas a duct cable likely would not, but needs flexibility in order to be strung through ductwork that may change direction sharply). The use of a single cable type can simplify construction of a cable network, as often two or more of these types of applications will be present within the same network. Use of a single cable type reduces the amount of matching of cable performance that might otherwise be necessary.

Figure 3:
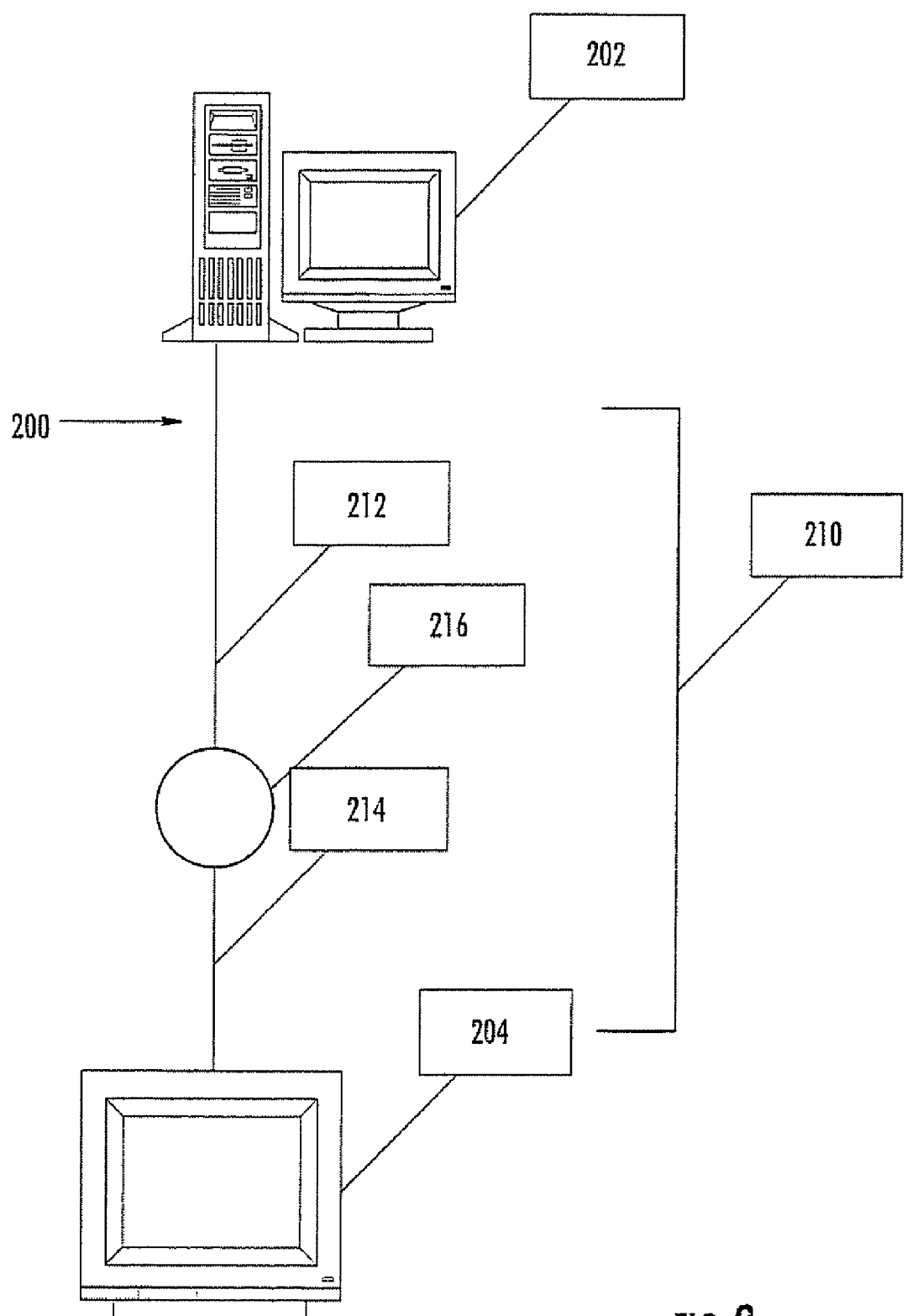
FIG. 3 is a schematic view of a hybrid fiber-cable network of the present invention.

Referring now to FIG. 3, a communications system, designated broadly at 200, is illustrated therein. The communications system 200 includes one or more transmitters 202 and one or more receivers 204 that are interconnected with an HFC network 210. The HFC network 210 includes an optical fiber portion 212 that includes optical fiber, preferably of the type described above, and a coaxial cable portion 214 that includes coaxial cable as described above. In the illustrated system 200, the optical fiber portion 212 is connected to the transmitter 202 and travels to a node 216 located near the receiver 204, where the signal is converted from an optical signal to an electrical signal by techniques known to those skilled in this art. The coaxial cable portion 214 travels from the node 216 to the receiver 204.

The optical fiber portion 212, although illustrated as a single transmission line, more typically includes a number of discrete optical fiber lengths that travel either (a) from the transmitter 202 to an intermediate node or hub, (b) between intermediate nodes or hubs, or (c) from an intermediate node or hub to the node 216. The presence of the intermediate nodes can provide significant flexibility to the system for operation. maintenance, modification, and enhancement. It will also be understood by those skilled in this art that other components, such as amplifiers, multiplexers, demultiplexers, wave-division multiplexers and demultiplexers, splitters, and the like may also be included in the optical fiber portion 212. It should also be noted that, although only a single transmitter 202 is illustrated herein, in many embodiments multiple transmitters 202 will feed signals into the HFC network 210. Also, in some embodiments a single transmitter 202 may feed multiple signals into the optical fiber portion 212, or may feed a signal of multiple bandwidths into the optical fiber portion 212.

In traveling from the node 216 to the receiver 204, the coaxial cable portion 214 typically has a relatively short travel path (ordinarily on the order of 1,000 to 6,000 feet); for example, it may only travel from a central location within a neighborhood. It should be noted that, although only a single coaxial cable portion 214 is illustrated herein, in many embodiments multiple coaxial cable portions will extend from the node 216 to multiple receivers 204, and that multiple receivers 204 may also receive signals from a common coaxial cable portion 214.

Exemplary devices that may serve as transmitters 202 include broadband video devices, cable television devices and modems, telephony devices, data distribution devices, Internet servers, and the like. Exemplary devices that may serve as receivers 204 include the types of devices that would typically receive signals from these transmitters, including televisions, cable television boxes and modems, telephones, wireless networks, personal computers, handheld devices, interactive gaming devices, and the like. It should also be understood that, although the transmitters 202 is illustrated as a transmitter and the receiver 204 described as receivers, signals can be processed in either direction between the transmitter 202 and the receiver 204.

The invention will be described in greater detail in the following non-limiting examples.

EXAMPLE 1

A cable can be constructed according to the parameters set forth in Table 1.

TABLE 1

| Component | Material | Size (in.) |
| --- | --- | --- |
| Conductor | CCA | 0.166 OD |
| Dielectric Layer | 85% HDPE/15% LDPE density ≦ 0.215 g/cc | 0.686 OD |
| Adhesive | Aggressive | |
| Shield | Aluminum | 0.715 OD |
| Jacket | MDPE and carbon black | 0.785 OD |

This cable has the following properties set forth in Table 2.

TABLE 2

| Property | Value |
| --- | --- |
| Nominal Impedance | 75 Ω ± 2 Ω |
| Attenuation | 1.52 db/100 ft @ 1 GHz |
| Reverse Bending | 69 cycles to failure |
| Minimum Bend Radius | 5 in. |
| Cyclic Expansion Loop Fatigue | 23,500 cycles |
| Velocity of Propagation | 89 percent |

EXAMPLE 2

A cable can be constructed according to the parameters set forth in Table 3.

TABLE 3

| Component | Material | Size (in.) |
| --- | --- | --- |
| Conductor | CCA | 0.166 OD |
| Insulator | 85% HDPE/15% LDPE density ≦ 0.215 g/cc | 0.686 OD |
| Adhesive | Controlled | |
| Shield | Aluminum | 0.715 OD |
| Jacket | MDPE and carbon black | 0.785 OD |

This cable has the following properties set forth in Table 4.

TABLE 4

| Property | Value |
| --- | --- |
| Nominal Impedance | 75 Ω ± 2 Ω |
| Reverse Bending | 69 cycles |
| Minimum Bend Radius | Approximately 3 in. |
| Cyclic expansion Loop Fatigue | 23,500 cycles |
| Coring | Cored cleanly |
| Velocity of Propagation | 89 percent |

EXAMPLE 3

A cable can be constructed according to the parameters set forth in Table 5.

TABLE 5

| Component | Material | Size (in.) |
| --- | --- | --- |
| Conductor | CCA | 0.166 OD |
| Insulator | 85% HDPE/15% LDPE density ≦ 0.215 g/cc | 0.686 OD |
| Adhesive | Controlled | |
| Shield | Aluminum | 0.715 OD |
| Jacket | MDPE and carbon black | 0.785 OD |

This cable has the following properties set forth in Table 6.

TABLE 6

| Property | Value |
| --- | --- |
| Nominal Impedance | 75 Ω ± 2 Ω |
| Attenuation | 1.52 db/100 ft @ 1 GHz |
| Coring | Cored cleanly |
| Velocity of Propagation | 89 percent |

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A coaxial cable, comprising:
    a metallic inner conductor formed of a first material and having a first thickness;
    a dielectric layer circumferentially surrounding the inner conductor formed of a second material and having a second thickness;
    a metallic outer conductor circumferentially surrounding the dielectric layer formed of a third material and having a third thickness; and
    a polymeric jacket circumferentially surrounding the outer conductor formed of a fourth material and having a fourth thickness;
    wherein the first material, first thickness, second material, second thickness, third material, third thickness, fourth material and fourth thickness are selected so that the cable has:
    (a) a usable bandwidth between about 5 MHz and the cut-off frequency of the cable;
    (b) a minimum bend radius of less than about 5 times the jacket outer diameter; and
    (c) a velocity of propagation of greater than about 88;
    (d) a return loss of at least about −25 dB; and
    (e) a nominal impedance of 75 ohms.

2. The coaxial cable defined in claim 1, wherein at least one of the first material, first thickness, second material, second thickness, third material, third thickness, fourth material and fourth thickness is further selected so that the cable has a continuous usable bandwidth above about 1.0 GHz.

3. The coaxial cable defined in claim 1, wherein at least one of the first material, first thickness, second material, second thickness, third material, third thickness, fourth material and fourth thickness is further selected so that the cable has a continuous bandwidth above about 3.0 GHz.

4. The coaxial cable defined in claim 1, wherein at least one of the first material, first thickness, second material, second thickness, third material, third thickness, fourth material and fourth thickness is further selected so that the cable has an attenuation spike due to return loss within the usable bandwidth.

5. The coaxial cable defined in claim 1, wherein the cable has a length of at least 1,000 feet.

6. The coaxial cable defined in claim 1, wherein the first material is selected from the group consisting of: copper; aluminum and steel clad with copper; and aluminum, copper and steel clad with silver.

7. The coaxial cable defined in claim 1, wherein the second material is a foamed polymeric material.

8. The coaxial cable defined in claim 1, wherein the dielectric layer has a density gradient across its cross-section such that density increases with increasing radial distance from the inner conductor.

9. The coaxial cable defined in claim 1, wherein the third material is selected from the group consisting of solid copper and solid aluminum.

10. The coaxial cable defined in claim 1, wherein a corrosion-resistant material is interposed between the outer conductor and the jacket.

11. The coaxial cable defined in claim 10, wherein the corrosion-resistant material is a dry material.

12. The coaxial cable defined in claim 1, wherein the cable withstands at least 5 cycles in reverse bend fatigue tests.

13. A hybrid fiber cable (HFC) network, comprising:
   two coaxial cables as defined in claim 1; and
   an optical fiber in communication with the coaxial cable, wherein together the coaxial cable and the optical fiber define a transmission path.

14. The HFC network defined in claim 13, wherein the optical fiber has a zero dispersion wavelength of about 1310 nm, a loss at 1385 nm that is less than its loss at 1310 nm and a chromatic dispersion of between 1.5 and 8.0 ps/nm-km in the 1.4 μm wavelength region.

* * * * *

UNITED STATES PATENT AND TRADEMARK OFFICE
CERTIFICATE OF CORRECTION

PATENT NO. : 7,692,098 B2
APPLICATION NO. : 12/022702
DATED : April 6, 2010
INVENTOR(S) : Wyatt, II et al.

It is certified that error appears in the above-identified patent and that said Letters Patent is hereby corrected as shown below:

On Title Page:
(75) Inventors: Please correct Douglas Blew's city of residence so that "Morresville" reads
-- Mooresville --

(56) References, Foreign Patent Documents: Please correct "WO 92/13426" to read
-- WO 02/13426 --

Signed and Sealed this
Twenty-eighth Day of December, 2010

David J. Kappos
*Director of the United States Patent and Trademark Office*